No. 737,967. Patented September 1, 1903.

UNITED STATES PATENT OFFICE.

FRIEDRICH SCHMIDT, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

VIOLET-RED AZO DYE AND PROCESS OF MAKING SAME.

SPECIFICATION forming part of Letters Patent No. 737,967, dated September 1, 1903.

Application filed January 14, 1903. Serial No. 139,063. (No specimens.)

*To all whom it may concern:*

Be it known that I, FRIEDRICH SCHMIDT, Ph. D., a citizen of the Empire of Germany, residing at Höchst-on-the-Main, Germany, have invented certain new and useful Improvements in Azo Dyes and Process of Making the Same, of which the following is a specification.

It is known by German Patents Nos. 66,838 and 67,240 that ortho-oxyazo dyestuffs derived from alpha-naphtholsulfonic acid yield blue to black shades by treatment on wool with chromic acid. It is further known that dyestuffs are obtained which contain the ortho-oxyazo group twice or four times in the dyestuff molecule—a result which lends an increased dyeing power and resistance to the dyestuffs. The latter are derived from orthoamidophenol or from 2:6-diamidophenol. If it is desired to obtain pure naphthaleneazo dyestuffs of the kind in question, the available ortho-amidonaphtholsulfonic acids are soon exhausted, since the majority of them (the alpha beta derivatives) cannot be diazotized or can be diazotized only with a poor yield.

I have found that the diazo derivatives of beta$^1$ alpha$^1$-amidonaphthol or its sulfonic acids may be produced with acid of beta-naphthylaminsulfonic acids, which contain a sulfonic group in the alpha$^1$ position. If these acids be diazotized and soda be added, the sulfonic group, which can be easily eliminated from the naphthalene nucleus, is separated and there is produced the naphthalene-2:1-diazo-oxid

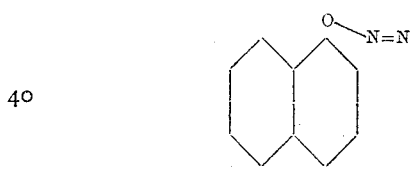

(*Berichte*, XXVII, 679, 2211; *Journal of the Chemical Society* 1895, 909.) The naphthalene-2:1-diazo-oxid may be combined with compounds to form azo dyestuffs having the desired group of atoms.

To produce a disulfonic acid of the naphthalene-2:1-diazo-oxid

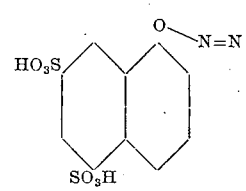

the 2-naphthylamin 1:5:7-trisulfonic acid is particularly suitable. When treated in the manner outlined above and combined with beta-naphthol, it yields a valuable dyestuff having the formula:

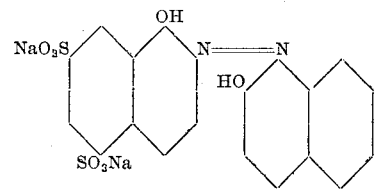

Example: 38.3 kilos of beta$_1$-naphthylamin-alpha$_1$ alpha$_3$ beta$_4$-trisulfonic acid are transformed with 6.9 kilos of nitrite into the diazo compound in the usual manner. The slightly-yellow solution of the diazo compound is then exactly neutralized with caustic-soda lye or sodium carbonate and an excess of the latter being added. The yellow color of the solution becomes orange-red and the exchange of the alpha$_1$-sulfonic group for the hydroxyl is completed after some hours. It may be heated to 50° centigrade and even above without decomposition setting in. After some time a solution of fifteen kilos of beta-naphthol in one hundred liters of water and 4.5 kilos of caustic soda is added. The formation of the dyestuff occurs after a few minutes by the originally orange-red solution becoming finally violet. If the combination occurs with heating (about 40 to 50° centigrade,) the solution has assumed after one to two hours a pure blue-violet color. On addition of caustic-soda lye the color turns red, also on being acidified. The dyestuff is salted out and dried. Dyed on wool it yields violet-red, which on being boiled with bichromate becomes blue-black.

Having now described my invention, what I claim is—

1. The herein-described process for the manufacture of a violet-red azo dyestuff, yielding, when dyed on wool and subsequently treated with chromic acid, fast-black shades, which consists in diazotizing beta[1]-naphthyl-amin-alpha[1] alpha[3] beta[4]-trisulfonic acid, in treating this diazo compound with alkali carbonates, and in combining the naphthalene-2:1-diazo-oxid-5:7-disulfonic acid thus formed with beta-naphthol, substantially as described.

2. As a new product the dry dyestuff being a brown-black powder, readily soluble in water with a red color, if the dyestuff is salted out from its solution in an acid, and with a blue color if salted out in an alkaline reaction; it is soluble in a solution of sodium carbonate with a blue color; on addition of caustic-soda lye the color turns to fuchsin-red; it is soluble in diluted ammonia with a blue color; concentrated sulfuric acid dissolves it to a violet coloration and on diluting this solution with water the dyestuff is precipitated as brown flakes.

In testimony that I claim the foregoing as my invention I have signed my name in presence of two subscribing witnesses.

FRIEDRICH SCHMIDT.

Witnesses:
ALFRED BRISBOIS,
BERNHARD LEYDECKER.